(12) United States Patent
Wang et al.

(10) Patent No.: US 12,535,646 B2
(45) Date of Patent: Jan. 27, 2026

(54) FILTER ASSEMBLY AND UNMANNED AERIAL VEHICLE

(71) Applicant: SHENZHEN NEEWER TECHNOLOGY CO. LTD, Shenzhen (CN)

(72) Inventors: Jun Wang, Shenzhen (CN); Yan Ke, Shenzhen (CN)

(73) Assignee: SHENZHEN NEEWER TECHNOLOGY CO. LTD, Shenzhen (CN)

( * ) Notice: Subject to any disclaimer, the term of this patent is extended or adjusted under 35 U.S.C. 154(b) by 585 days.

(21) Appl. No.: 18/070,779

(22) Filed: Nov. 29, 2022

(65) Prior Publication Data

US 2024/0142740 A1     May 2, 2024

(30) Foreign Application Priority Data

Oct. 31, 2022     (CN) .......................... 202222892104.0

(51) Int. Cl.
| | |
|---|---|
| G02B 7/00 | (2021.01) |
| B64U 20/87 | (2023.01) |
| B64U 101/30 | (2023.01) |
| G03B 17/14 | (2021.01) |
| G03B 17/56 | (2021.01) |

(52) U.S. Cl.
CPC ............. *G02B 7/006* (2013.01); *B64U 20/87* (2023.01); *G03B 17/14* (2013.01); *G03B 17/565* (2013.01); *B64U 2101/30* (2023.01)

(58) Field of Classification Search
CPC ........ G02B 7/006; B64U 20/87; G03B 17/12; G03B 17/14; G03B 17/16
USPC .......................................................... 359/892
See application file for complete search history.

(56) References Cited

U.S. PATENT DOCUMENTS

| | | | | |
|---|---|---|---|---|
| 2,707,418 | A | * | 5/1955 | Magnuson ............. G03B 17/12 359/830 |
| 4,536,057 | A | * | 8/1985 | Sumi .................... G02B 26/007 359/827 |
| 5,862,428 | A | * | 1/1999 | An ......................... G03B 17/12 359/889 |
| 7,738,199 | B1 | * | 6/2010 | Wen ....................... G03B 11/00 359/722 |

(Continued)

OTHER PUBLICATIONS

VMTHardware,. Tolerance Press Fit: A Comprehensive Guide. [online blog] VMTHardware, Dec. 11, 2024 [retrieved Jun. 27, 2025]. Retrieved from the internet <https://vmtcnc.com/tolerance-press-fit/> (Year: 2024).*

(Continued)

*Primary Examiner* — Balram T Parbadia
*Assistant Examiner* — Seth D Moser
(74) *Attorney, Agent, or Firm* — Westbridge IP LLC

(57) ABSTRACT

Disclosed is a filter assembly and an unmanned aerial vehicle (UAV). The filter assembly includes a base and a filter holder. The base includes a mounting hole and a convex plate. The mounting hole is defined through the base along a first direction and matched with an outer periphery of a lens. The convex plate protrudes from a periphery of the mounting hole in the base along the first direction, and is configured to press against and match with a protrusion portion of the lens to mount the base on the lens. The filter holder is provided with a filter and detachably mounted on the base.

14 Claims, 3 Drawing Sheets

(56) References Cited

U.S. PATENT DOCUMENTS

| | | | | |
|---|---|---|---|---|
| 2010/0027120 A1* | 2/2010 | Elowitz | ............... | G03B 11/041 |
| | | | | 359/511 |
| 2015/0336670 A1* | 11/2015 | Zhang | ................... | B29C 43/18 |
| | | | | 244/119 |
| 2020/0092482 A1* | 3/2020 | Tsuruyama | ............... | G06T 5/73 |
| 2022/0120995 A1* | 4/2022 | Li | ....................... | G02B 13/001 |
| 2022/0146911 A1* | 5/2022 | Gwalani | ................ | G03B 11/00 |

OTHER PUBLICATIONS

VMTHardware,. Tolerance Press Fit: A Comprehensive Guide. (Year: 2024).*

* cited by examiner

FILTER ASSEMBLY AND UNMANNED AERIAL VEHICLE

CROSS-REFERENCE TO RELATED APPLICATIONS

This application claims priority to Chinese Patent Application No. 202222892104.0, filed on Oct. 31, 2022, the entire contents of which are incorporated herein by reference.

TECHNICAL FIELD

The present disclosure relates to the technical field of unmanned aerial vehicle (UAV) lens accessories, in particular to a filter assembly and a UAV.

BACKGROUND

The aerial photography of unmanned aerial vehicle (UAV) is applied with an unmanned aircraft as an aerial platform to take pictures with a high-resolution digital lens or a light optical lens. However, due to uncertain factors such as ultraviolet rays, reflected light from objects, polarized light and others, the quality of the images is poor. Thus, optical filters are commonly used in UAV photography.

However, because the filters cannot be directly installed on the UAV lens, it is necessary to use a connecting device. In the prior art, one way to install the filter on the UAV is using a buckle structure. The buckle structure is divided into a male buckle and a female buckle. The male buckle is convex and the female buckle is concave. Before buckling, there is a guiding bevel to guide the buckling direction. During the buckling, the elastic arm of the male buckle is deformed and pressed into the female buckle, which requires a strong strength. After buckling, the convex surface of the male buckle is in tight contact with the concave surface of the female, which requires the angle of the engagement surface smaller than the guiding angle.

In addition, there are many problems exist when assembling or disassembling the optical filter installed by the buckle structure. For example, during disassembly and assembly, if the force is too big, the buckle may be damaged or dead-locked; if the force is too small, the two parts of the buckle structure may fail to match with each other. What's worse, if the force is dislocated, the mounting part will be disengaged. In addition, the disassembly and assembly of the filter is easy to wear out the buckle structure, which affects the tightness of the installation. The use effect of the filter may be affected because of the looseness. Besides the buckle structure depends on the mating of the female buckle and the male buckle, which result in that the connection strength is not strong and reliable enough.

SUMMARY

The present disclosure aims to solve the technical problem that the buckle structure is easy to wear out during assembly and disassembly, and the connection by the buckle is unreliable. Thereby, the present disclosure provides a filter assembly that is not easy to wear out and has reliable connection.

In order to solve the above mentioned technical problems, the present disclosure provides a filter assembly. The optical filter includes a base and a filter holder. The base includes a mounting hole and a convex plate. The mounting hole is defined through the base along a first direction and matched with an outer periphery of a lens. The convex plate protrudes from a periphery of the mounting hole in the base along the first direction, and is configured to press against and match with a protrusion portion of the lens to mount the base on the lens. The filter holder is provided with a filter and detachably mounted on the base.

In some embodiments, the base includes an elastic sheet made of an elastic material, and the elastic sheet is configured to firmly contact with a side of the convex plate close to the mounting hole.

In some embodiments, the base is matched with the filter holder via ear-like plates, and the ear-like plates are provided with magnetically attracted devices.

In some embodiments, one of the filter holder and the base is provided with a magnet, and the other one of the filter holder and the base is provided with a magnet or an iron sheet.

In some embodiments, the filter holder is screwed or snap-connected to the base.

In some embodiments, the filter assembly further includes a cover detachably mounted on the filter holder to cover the filter.

In some embodiments, a convex height of the convex plate is equal to a convex height of the lens.

In some embodiments, an orthographic projection of the convex plate is rectangular, semicircular, scalloped or trapezoidal.

In some embodiments, when the base is assembled with the filter holder, a projection of the convex plate along the first direction is outside the protrusion portion and a projection of the filter holder along the first direction is inside the protrusion portion.

In some embodiments, the base has an interference fit with the outer periphery of the lens.

In some embodiments, a tolerance of the interference fit is from +0.005 mm to +0.01 mm.

In some embodiments, a structural gap is formed between the convex plate and the filter holder when the base is engaged with the filter holder to accommodate the protrusion portion of the lens.

In some embodiments, the base includes at least two convex plates spaced from each other.

In some embodiments, the base includes at least two convex plates symmetrically spaced.

The present disclosure further provides an unmanned aerial vehicle (UAV). The UAV includes a UAV lens and a filter assembly mounted on the UAV lens.

The solutions of the present disclosure have the following advantages:

1. The present disclosure provides a filter assembly. The base is mounted outside the outer periphery of the UAV lens. The base is mechanically matched with the outer periphery of the lens. That is, the fixed connection is achieved by the interference fit and the detachable mounting is achieved by controlling the tolerance of the interference fit. Thus, the operation is simple, the bearing capacity is large and the connection is reliable. What's more, it is not easy to wear out after using for a long term, and the use efficiency and service life are improved.

2. The present disclosure provides a filter assembly. The elastic sheet can be reused for many times, the connection is reliable and the cost is relatively low, which meets the requirements of the users. In addition, no more extra fixing parts are needed to be mounted on the base, which makes the whole structure smaller and reduces the cost.

3. The present disclosure provides a filter assembly. The magnetic device can achieve an automatic attracting connection, which is convenient to operate and can locate the position magnetically. The cost for making a magnetic device mold is low and the mold can be customized according to personal preferences. Besides, since a long-term use will not cause wear and tear, it is no need to replace the magnetic device frequently. Thus, the service life is long. The edge of the ear-like plate is facilitate to locating the position, which makes the connection more convenient.
4. The present disclosure provides a filter assembly. The interference fit can reduce the amount of the parts and make the structure of the filter assembly simpler. The cover mounted on the filter holder can protect the filter from dust and accidental contact during non-working hours. The installation is easy and the sealing is reliable. The convex plate and the protrusion portion of the lens have the same convex height. The protrusion portion of the lens may play the role of shading and ensure the assembly accuracy between the filter assembly and the outer periphery of the lens.
5. The present disclosure provides a filter assembly. The structural gap is formed between the convex plate and the filter holder when the base is engaged with the filter holder to accommodate the protrusion portion of the lens, which is a reasonable structure and can restrict the rotation of the filter assembly when the UAV is working. The structure plays a limiting role. The at least two convex plates make the connection more reliable and further locate the position.

BRIEF DESCRIPTION OF THE DRAWINGS

In order to more clearly illustrate the technical solutions in the embodiments of the present disclosure or in the related art, drawings in the embodiments or in the related art will be briefly described below. Obviously, the drawings in the following description are only some embodiments of the present disclosure. Other drawings can be obtained by those skilled in the art according to the structures shown in the drawings without creative work.

DETAILED DESCRIPTION OF THE EMBODIMENTS

Figure 1:
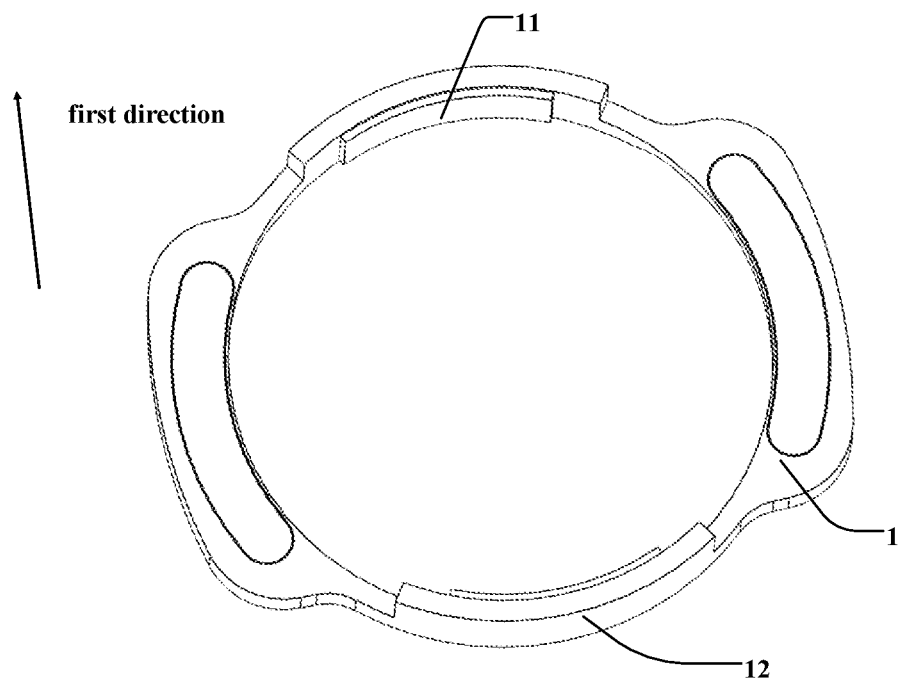
FIG. 1 is a schematic structural view of a base of a filter assembly according to some embodiments of the present disclosure.
Figure 2:
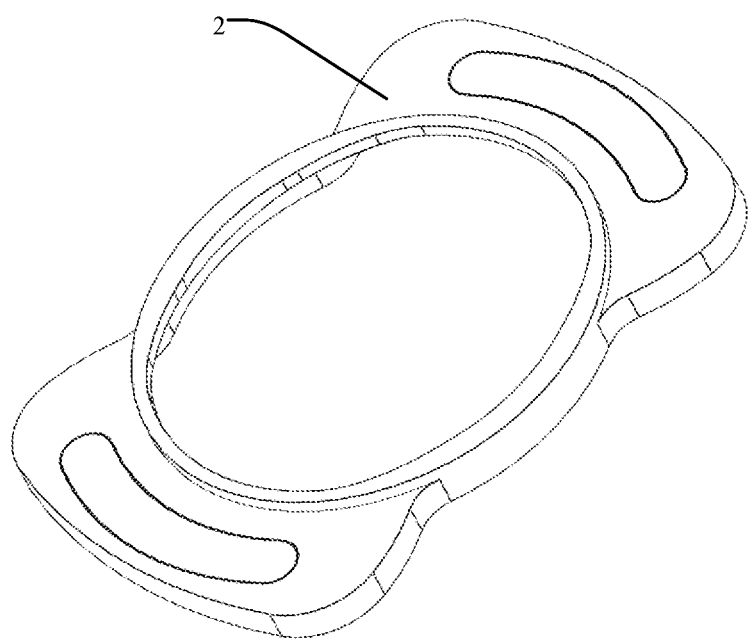
FIG. 2 is a schematic structural view of a filter holder of a filter assembly according to some embodiments of the present disclosure.
Figure 3:
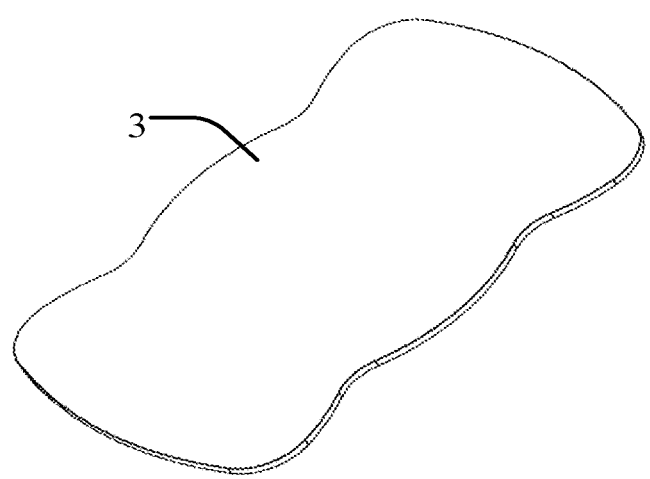
FIG. 3 is a schematic structural view of a cover of a filter assembly according to some embodiments of the present disclosure.
Figure 4:
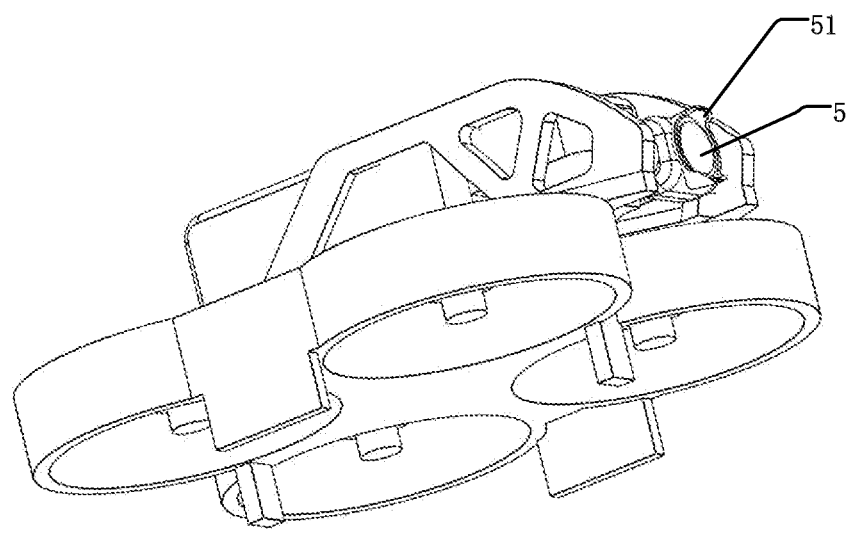
FIG. 4 is a schematic structural view of a lens according to some embodiments of the present disclosure.
Figure 5:
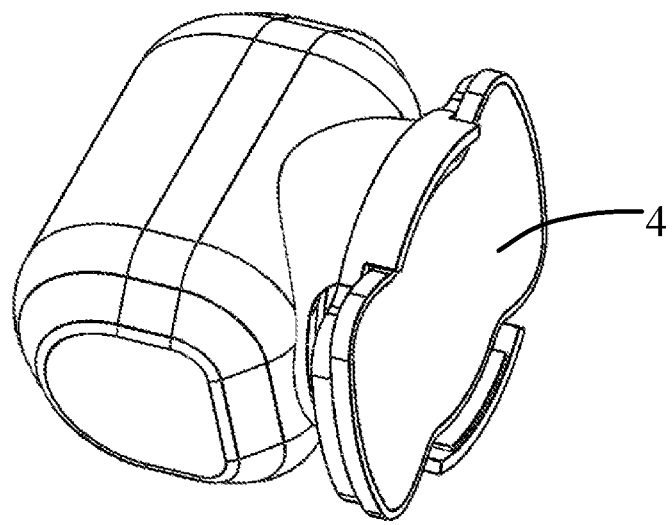
FIG. 5 is an assembled diagram of a filter assembly according to some embodiments of the present disclosure.
Figure 6:
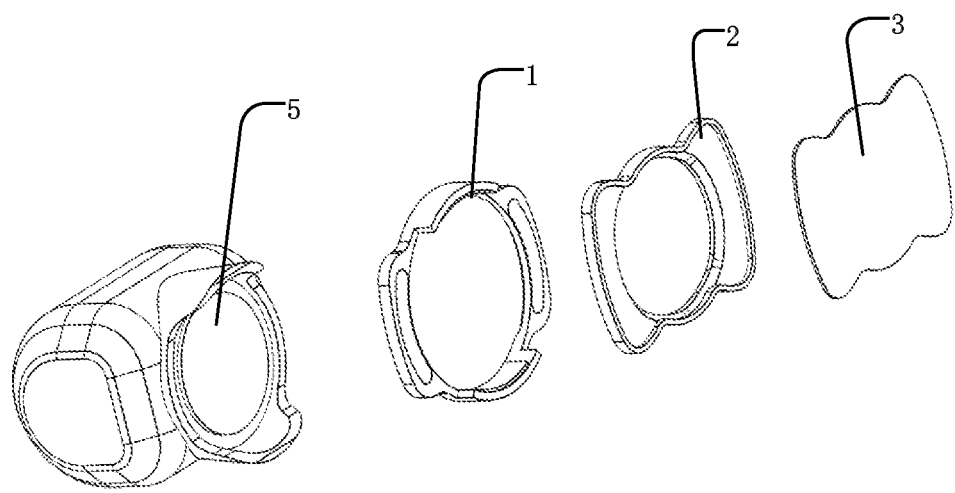
FIG. 6 is a disassembled diagram of a filter assembly according to some embodiments of the present disclosure.

The technical solutions of embodiments of the present disclosure will be clearly and completely described with reference to the drawings of the present disclosure. Obviously, the described embodiments are only some rather than all of the embodiments of the present disclosure. Based on the embodiments of the present application, all other embodiments obtained by those skilled in the art without creative efforts shall fall within the scope of the present disclosure.

It should be noted that all directional indicators (such as up, down, left, right, front, rear, etc.) in the embodiments of the present disclosure are only used to explain the relative positional relationship, movement situation, etc. among components in a specific attitude (as shown in the drawings). If the specific attitude changes, the directional indication also changes accordingly. In addition, the descriptions related to "first", "second" and the like in the present disclosure are merely for descriptive purposes, and should not be understood as indicating or implying their relative importance or implicitly indicating the number of technical features indicated.

In the present disclosure, unless otherwise specifically specified and limited, the terms "connected", "fixed", etc. should be understood in a broad sense, for example, "fixed" can be a fixed connection, a detachable connection, or be integrated as a whole; "connected" can be a mechanical connection or an electrical connection; can be directly connected, or indirectly connected through an intermediate medium, or can be the internal communication between two elements or the interaction relationship between two elements. For those of ordinary skilled in the art, the specific meaning of the above-mentioned terms in the present disclosure can be understood according to specific situations.

Besides, the technical features of the following embodiments in the present disclosure can be combined as long as the combination is not contradictory.

As shown in FIG. 1 to FIG. 6, the present disclosure provides a filter assembly 4.

The filter assembly 4 includes a base 1 and a filter holder 2. A mounting hole is defined through the base 1 along a first direction and matched with an outer periphery of a lens 5. The base 1 is further provided with a convex plate 12 protruding from a periphery of the mounting hole in the base 1 along the first direction. The convex plate 12 is configured to press against and match with a protrusion portion 51 of the lens 5 to mount the base 1 on the lens 5.

The filter holder 2 is provided with a filter and the filter holder 2 is detachably mounted on the base 1.

It should be noted that the first direction may be a direction indicated in FIG. 1.

In some embodiments, the filter assembly 4 may be used as an accessory of the unmanned aerial vehicle (UAV), and the filter assembly 4 can be disassembled and assembled by detachably connecting to the lens 5 of the UAV.

The mounting hole is defined through the base 1 along the first direction, and the inner wall of the mounting hole is matched with the outer periphery of the lens 5. In some embodiments, both the mounting hole and the lens 5 are circular, and the inner wall of the mounting hole is matched with the outer periphery of the lens, which facilitates the mounting of the base 1 on the lens 5.

In some embodiments, the lens 5 is provided with a protrusion portion 51 which may shade. The base 1 is connected to the lens 5 by matching with the protrusion portion 51 of the lens 5 in the present disclosure. A convex plate 12 protrudes from the base 1 and the convex plate 12 has an interference fit with the protruding portion 51 of the lens 5. The characteristic of the lens structure is utilized for fixed mounting, which can make the mounting more reliable.

During the process of mounting the base 1 on the lens 5, a downward pressure can be exerted along the first direction and a circumferential force along the lens periphery can be exerted on the base 1 to rotate the base 1 onto the outer periphery of the lens 5. Meanwhile, the convex plate 12 is firmly contact with the protrusion portion 51 of the lens 5. The base 1 has an interference fit with the outer periphery of the lens 5 and the detachable mounting is achieved by controlling the tolerance of the interference fit. During the process of disassembling the base 1, an upward force and a circumferential force along the lens periphery can be exerted on the base 1 to rotate the base 1 out of the lens 5. A tolerance of the interference fit is from +0.005 mm to +0.01 mm, which can satisfy the need for daily assembly and disassembly of the filter assembly 4. An orthographic projection of the convex plate 12 can be rectangular and can be in the form of other simple geometric shapes, such as semicircle, sector, trapezoid and so on.

The present disclosure provides a filter assembly. The base 1 is mounted outside the outer periphery of the UAV lens 5. The base 1 is mechanically matched with the outer periphery of the lens 5. That is, the fixed connection is achieved by the interference fit and the detachable mounting is achieved by controlling the tolerance of the interference fit. Thus, the operation is simple, the bearing capacity is large and the connection is reliable. What's more, it is not easy to wear out after using for a long term, and the use efficiency and service life are improved.

In some embodiments, the base 1 includes an elastic sheet 11 made of an elastic material, and the elastic sheet 11 is configured to firmly contact with a side of the convex plate 12 close to the mounting hole.

The elastic sheet 11 is an elastic component which may be deformed by external force, and can quickly return to its original shape after the external force is removed. In some embodiments, when the convex plate 12 is pressed against the protrusion portion 51 of the lens 5, the elastic sheet 11 is compressed, and the resilience force generated toward the rebound direction makes the convex plate 12 firmly fixed on the protrusion portion 51 of the lens 5. Meanwhile, a friction force is generated by mutual pressing between the elastic sheet 11 and the protrusion portion 51 can prevent the base 1 from falling off. The material of the elastic sheet 11 may be some common elastic materials such as rubber, sponge, latex and others.

The elastic sheet 11 can be reused for many times, the connection is reliable and the cost is relatively low, which meets the requirements of the users. In addition, no more extra fixing parts are needed to be mounted on the base 1, which makes the whole structure smaller and reduces the cost.

In some embodiments, the base 1 is matched with the filter holder 2 via ear-like plates, and the ear-like plates are provided with magnetically attracted devices.

The era-like plate structure is configured as two plates that grow out like ears on both sides of the filter holder 2 and the base 1 for connection and fixation. When the base 1 is connected to the filter holder 2, the positioning can be achieved by matching the edge of the ear-like plates. The filter holder 2 and the base 1 are magnetically connected by the magnetic attraction device on the ear-like plates, and the magnet device can be a single-sided magnet, which can greatly enhance the magnetic force of the matching side, and greatly reduce costs and save magnetic materials. The filter holder 2 can be screwed, snap-connected or glue-connected to the base 1.

The present disclosure provides a filter assembly. The magnetic device can achieve a automatic attracting connection, which is convenient to operate and can locate the position magnetically. The cost for making a magnetic device mold is low and the mold can be customized according to personal preferences. Besides, since a long-term use will not cause wear and tear, it is no need to replace the magnetic device frequently. Thus, the service life is long. The edge of the ear-like plate is facilitate to locating the position, which makes the connection more convenient.

In some embodiments, the base 1 has an interference fit with the outer periphery of the lens 5.

The interference fit is a light interference fit, which uses the elasticity of the base 1 to expand and deform the mounting to sleeve the outer periphery of the lens 5. When the mounting hole is restored, a tightening force is generated on the outer peripheral of the lens, such that, the two connectors are firmly connected. The degree of tightening can exceed that of snap connection and key connection. The interference fit can reduce the amounts of parts and simplifies the structure of the filter assembly 4.

In some embodiments, the filter assembly 4 further includes a cover 3 detachably mounted on the filter holder 2 to cover the filter.

The cover 3 is sheet-shaped and covers the outside of the filter assembly 4, and the shape and size are matched with the filter holder 2, which protects the filter from dust and accidental contact during non-working hours. The installation is easy and the sealing is reliable.

In some embodiments, a convex height of the convex plate 12 is equal to a convex height of the lens 5.

The convex plate 12 and the lens 5 can have the same convex height within a certain error range, and the allowable error is from −1 mm to +1 mm. The assembly accuracy between the filter assembly 4 and the outer periphery of the lens 5 is ensured.

In some embodiments, when the base 1 is assembled with the filter holder 2, a projection of the convex plate 12 along the first direction is outside the protrusion portion 51 and a projection of the filter holder 2 along the first direction is inside the protrusion portion 51.

A structural gap is formed between the convex plate 12 and the filter holder 2 when the base 1 is engaged with the filter holder 2 to accommodate the protrusion portion 51 of the lens 5, which is a reasonable structure and can restrict the rotation of the filter assembly 4 when the UAV is working. The structure plays a limiting role. The at least two convex plates 12 make the connection more reliable and further locate the position.

In some embodiments, the base 1 includes at least two convex plates 12 symmetrically spaced.

There are at least two convex plates 12 to ensure that the filter assembly 4 can be fixed on the outer periphery of the lens 5. The convex plates 12 are spaced and symmetrically arranged to ensure that the position of the filter assembly 4 will not move relative to each other. The number and position of the convex plates 12 can be changed according to the number and position of the protrusion portion 51 of lens 5. The convex plate 12 is matched with the protrusion portion 51 of the lens, which makes the connection reliable and provides a positioning function.

The present disclosure further provides a UAV including a UAV lens 5 and the filter assembly 4 as described above.

Apparently, the above are all preferred embodiments of the present disclosure, and are not intended to limit the protection scope of the present disclosure. Therefore all equivalent changes made according to the structure, shape and principle of the present disclosure should be covered within the scope of the present disclosure.

What is claimed is:

1. A filter assembly, comprising:
   a filter holder provided with a filter; and
   a base comprising:
      a mounting hole defined through the base along a first direction and matched with an outer periphery of a lens; and
      a convex plate protruding from a periphery of the mounting hole in the base along the first direction, the convex plate being configured to press against and match with a protrusion portion of the lens to mount the base on the lens,
   wherein the filter holder is detachably mounted on the base;
   wherein the lens comprises a lens module comprising a lens housing;
   wherein the base is matched with the filter holder via ear-like plates, and the ear-like plates are provided with magnetically attracted devices.

2. The filter assembly of claim 1, wherein the base comprises an elastic sheet made of an elastic material, and the elastic sheet is configured to firmly contact with a side of the convex plate close to the mounting hole.

3. The filter assembly of claim 1, wherein one of the filter holder and the base is provided with a magnet, and the other one of the filter holder and the base is provided with a magnet or an iron sheet.

4. The filter assembly of claim 1, wherein the filter holder is screwed or snap-connected to the base.

5. The filter assembly of claim 1, further comprising:
   a cover detachably mounted on the filter holder to cover the filter.

6. The filter assembly of claim 1, wherein the convex plate is at a same height as the protrusion portion of the lens.

7. The filter assembly of claim 1, wherein an orthographic projection of the convex plate is rectangular, semicircular, scalloped or trapezoidal.

8. The filter assembly of claim 1, wherein when the base is assembled with the filter holder, a projection of the convex plate along the first direction is outside the protrusion portion and a projection of the filter holder along the first direction is inside the protrusion portion.

9. The filter assembly of claim 1, wherein the base has an interference fit with the outer periphery of the lens.

10. The filter assembly of claim 9, wherein a tolerance of the interference fit is from +0.005 mm to +0.01 mm.

11. The filter assembly of claim 1, wherein a structural gap is formed between the convex plate and the filter holder when the base is engaged with the filter holder to accommodate the protrusion portion of the lens.

12. The filter assembly of claim 1, wherein the base comprises at least two convex plates spaced from each other.

13. The filter assembly of claim 1, wherein the base comprises at least two convex plates symmetrically spaced.

14. An unmanned aerial vehicle (UAV), comprising a UAV lens and the filter assembly of claim 1 mounted on the UAV lens.

* * * * *